(12) United States Patent
Busick

(10) Patent No.: US 7,690,836 B2
(45) Date of Patent: Apr. 6, 2010

(54) MIXER BLADE ATTACHMENT WITH FLEXIBLE FINS

(75) Inventor: Louis M. Busick, Westerville, OH (US)

(73) Assignee: Frut LLC, Westerville, OH (US)

( * ) Notice: Subject to any disclaimer, the term of this patent is extended or adjusted under 35 U.S.C. 154(b) by 1004 days.

(21) Appl. No.: 11/335,286

(22) Filed: Jan. 19, 2006

(65) Prior Publication Data

US 2006/0171251 A1 Aug. 3, 2006

Related U.S. Application Data

(60) Provisional application No. 60/648,614, filed on Jan. 31, 2005.

(51) Int. Cl.
*A47J 43/044* (2006.01)
(52) U.S. Cl. ..................................... 366/313
(58) Field of Classification Search .................. 366/67, 366/309, 326.1, 312, 313, 197; 416/224, 416/240
See application file for complete search history.

(56) References Cited

U.S. PATENT DOCUMENTS

| | | | | |
|---|---|---|---|---|
| 2,027,756 A | * | 1/1936 | Tay | 366/195 |
| 2,181,078 A | | 11/1939 | Dehuff | |
| 2,207,651 A | * | 7/1940 | Batchelder | 15/245 |
| 2,315,235 A | * | 3/1943 | Weidner et al. | 416/60 |
| 2,318,534 A | | 5/1943 | Seybert | |
| 2,481,731 A | * | 9/1949 | Dubin | 366/331 |
| 2,580,551 A | * | 1/1952 | Kacena | 366/67 |
| 2,591,301 A | * | 4/1952 | Schacht | 15/245 |
| 2,641,412 A | * | 6/1953 | Byberg | 241/98 |
| 2,753,160 A | | 7/1956 | Gunn | |
| 3,328,005 A | | 6/1967 | McMaster et al. | |
| 3,330,539 A | | 7/1967 | Lurski | |
| 3,544,081 A | * | 12/1970 | Eckhardt | 366/313 |
| 4,183,680 A | | 1/1980 | Manfroni | |
| 4,759,635 A | * | 7/1988 | MacMichael et al. | 366/274 |
| 4,946,285 A | | 8/1990 | Vennemeyer | 366/288 |
| 5,117,550 A | * | 6/1992 | Nadeau et al. | 29/527.3 |
| 5,176,418 A | * | 1/1993 | Niu | 294/7 |
| 5,556,201 A | | 9/1996 | Veltrop et al. | 366/203 |
| 5,975,753 A | | 11/1999 | Meyer | |
| 6,257,752 B1 | * | 7/2001 | Browne | 366/129 |
| 6,273,602 B1 | * | 8/2001 | Steiner et al. | 366/129 |
| 6,467,948 B1 | | 10/2002 | Lawson | 366/314 |
| 7,314,308 B2 | | 1/2008 | Fallowes | |
| 2002/0093210 A1 | * | 7/2002 | Sassone et al. | 294/7 |
| 2005/0083777 A1 | * | 4/2005 | Browne | 366/129 |
| 2006/0268659 A1 | | 11/2006 | Kaas | |

* cited by examiner

*Primary Examiner*—David L Sorkin
(74) *Attorney, Agent, or Firm*—Standley Law Group LLP

(57) ABSTRACT

The present invention is an attachment to a mixer blade for wiping the sides of a container and producing a mixture that is uniform and consistent. The attachment is placed onto the mixer blade either temporarily or permanently. After the attachment is on the mixer blade, the rotating spin of the mixer blade and the angular positioning of the flexible fins wipe the mixture on the sides of the container to the center of the container. By using a flexible material for the fins, the fins come into direct contact with the container while not damaging the container. The direct contact allows for the complete wiping of each side of the container. The attachment is easily cleaned.

18 Claims, 10 Drawing Sheets

US 7,690,836 B2

MIXER BLADE ATTACHMENT WITH FLEXIBLE FINS

This application claims the benefit of U.S. Provisional Application Ser. No. 60/648,614, filed on Jan. 31, 2005, which is incorporated herein by reference.

FIELD OF THE INVENTION

This invention relates generally to mixer blades and more specifically, to mixer blades with an attachment with flexible fins for wiping the sides of a container.

BACKGROUND AND SUMMARY OF THE INVENTION

Mixers come in a variety of styles. There are many types of mixers ranging from hand held appliances to large mixers for commercial use. In some applications of mixers, a single blade is used for mixing material in a container. The mixer blade rotates and hovers in a position right above the container to mix the material. In other applications, the mixer has two beaters.

Preferably, the mixer blade is composed of plastic or metal or other rigid material. The rigid material provides for sturdy attachment to the mixer. The attachable/detachable mixer blades may be removed from the mixer for easy cleaning.

In any of the previous described mixers, when mixing some of the ingredients may cling to the inside wall of the container so that the final product is improperly mixed or does not have the correct ratio of ingredients mixed uniformly and consistently throughout the product. In the previously described mixers, it is incumbent upon the user to utilize a spoon or the like to scrape away the ingredients clinging to the wall of the container. This poses a problem because users may have to consistently scrape the sides of the container. Users expose themselves to danger when the spoon or the like may catch in the mixer blade. To safely scrape the sides of the container, a user may have to turn off the mixer several times during the mixing process. This results in delay and inconvenience. Additionally, when users attempt to mix ingredients by repositioning the mixer blade, damage may occur when the mixer blade touches the side of the container.

In order to solve the previous problem, manufactures developed a paddle-like attachment to continually wipe the sides of the excess material. U.S. Pat. Nos. 4,946,285, 5,556, 201, 2,753,160. However, these inventions do not direct the flow of the mixture. Thus, the mixture is not uniform or consistent.

As a result, a need exists to provide an improved mixer blade that overcomes the above mentioned problems. A need exists for mixing ingredients in a consistent and uniform way while not damaging the container that contains the ingredients.

In accordance with one preferred embodiment of the present invention, an attachment for wiping a mixture from the sides of a container may be easily applied to a pre-existing mixer blade.

The attachment may be preferably heated permanently onto the pre-existing mixer blade. The attachment may also temporarily snap onto the pre-existing mixer blade.

The attachment may contain angular flexible fins for pushing the mixture to the center of the container. The fins may be used for lifting the mixture located in the center of the container. The fins may be made of a flexible material for providing smooth contact between the fins and the container.

The mixer blade attachment with flexible fins may provide a uniform and consistent mixture. The mixer blade attachment with the flexible fins is easy to clean.

In accordance with one embodiment of the present invention, an attachment for a mixer blade is described. The attachment allows for the smooth contact between the mixer blade and the container without damaging the container. The angular direction of the fins directs materials in the container downward. By directing material downward, the attachment gives the mixture uniformity and consistency.

In addition to the novel features and advantages mentioned above, other objects and advantages of the present invention will be readily apparent from the following descriptions of the drawings and exemplary embodiments.

BRIEF DESCRIPTION OF THE DRAWINGS

The novel features believed characteristic of the invention are set forth in the appended claims. The invention itself, as well as a preferred mode of use, and advantages thereof, will best be understood by reference to the following detailed description of exemplary embodiment(s) when read in conjunction with the accompanying drawings, wherein like reference numerals and symbols represent like elements.

DETAILED DESCRIPTION OF EXEMPLARY EMBODIMENT(S)

Referring to the Figures, an attachment to a mixer blade will be described. Like numbers are used to identify like parts.

FIGS. 1-7 show an embodiment of a mixer blade with an attachment that may comprise a rigid mixing blade structure 10. FIGS. 1, 2, 6 and 8-10 clearly show a blade 10 with a mixing body that, viewed in profile, a pair of rays that extend outward, forming an obtuse angle, from a vertex, the outward end of each ray connected to one of a pair of curved arms that come to a noticeable but blunt point at a bottom of the body. It can readily be appreciated from FIG. 9 that the blade 10 may be attached to the drive shaft of a mixer, and that the drive shaft attaching means is attached to the mixing body at. Additionally, FIG. 9 clearly shows that the mixing body has an axis of rotation generally defined by a line that passes through the vertex and the point.

Encasing the mixing blade 10 is an over molded elastomeric sheath 11. FIGS. 1, 2, 6, 8 and 9 clearly show that the over molded elastomeric sheath 11 encases the curved arms of the mixing blade 10. Integral to the sheath 11 are a plurality of elastomeric fins 12. The fins 12 may be spaced along the sheath 11. The fins may be placed at an angle. It is envisioned that one may attach the fins directly to the mixer blade without the use of an elastomeric sheath.

Once the sheath 11 is placed on the mixer blade 10 either permanently or temporarily, the mixer blade 10 may use the flexible fins 12 to push the mixture downward. The flexible fins 12 may be positioned at an angle and may be spaced completely around the elastomeric sheath 11.

Figure 1:
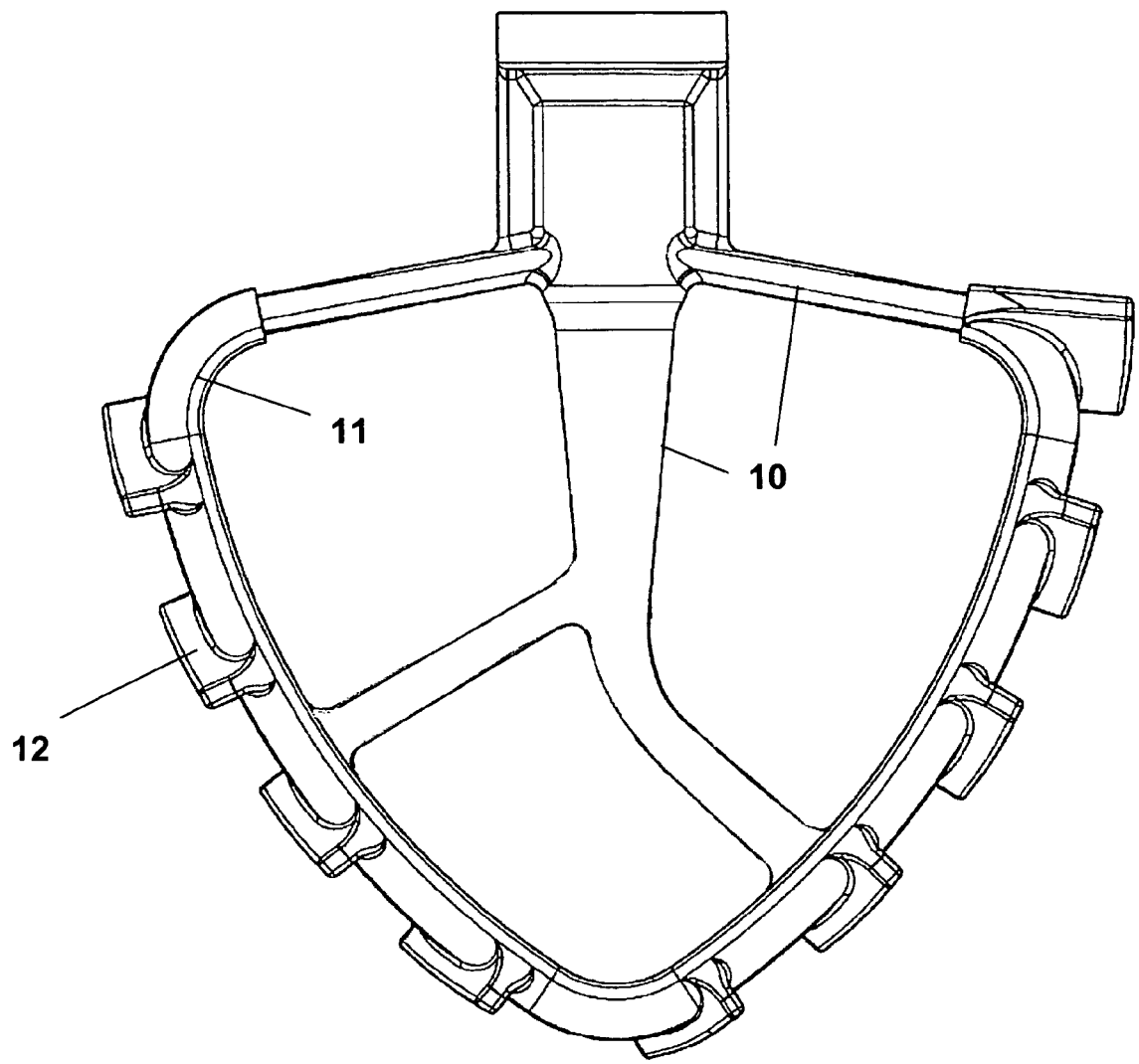
FIG. 1 is a front view of a mixer blade with one embodiment of an attachment of the present invention.
Figure 2:
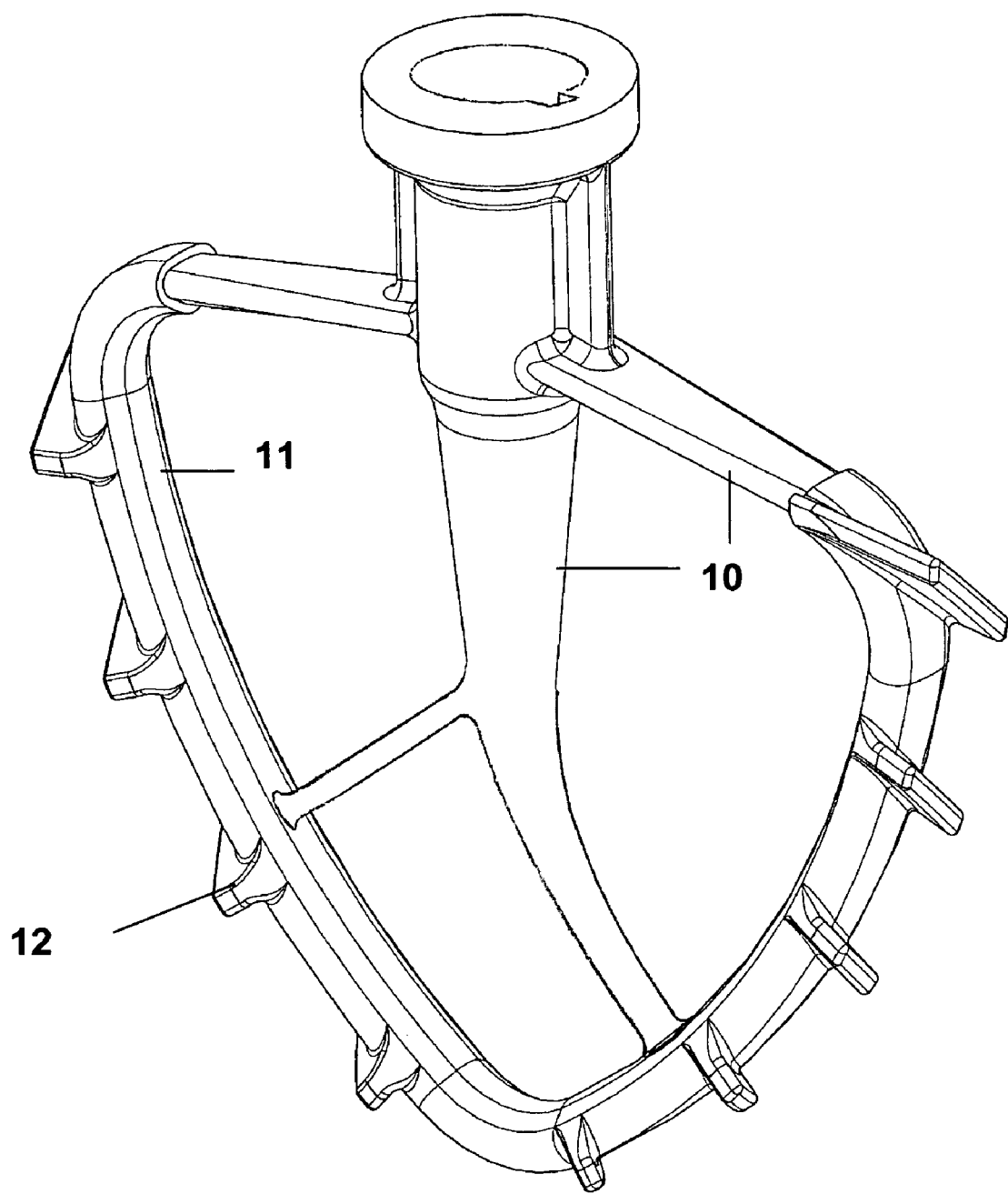
FIG. 2 is a top isometric view of the mixer blade with one embodiment of an attachment of the present invention.
Figure 3:
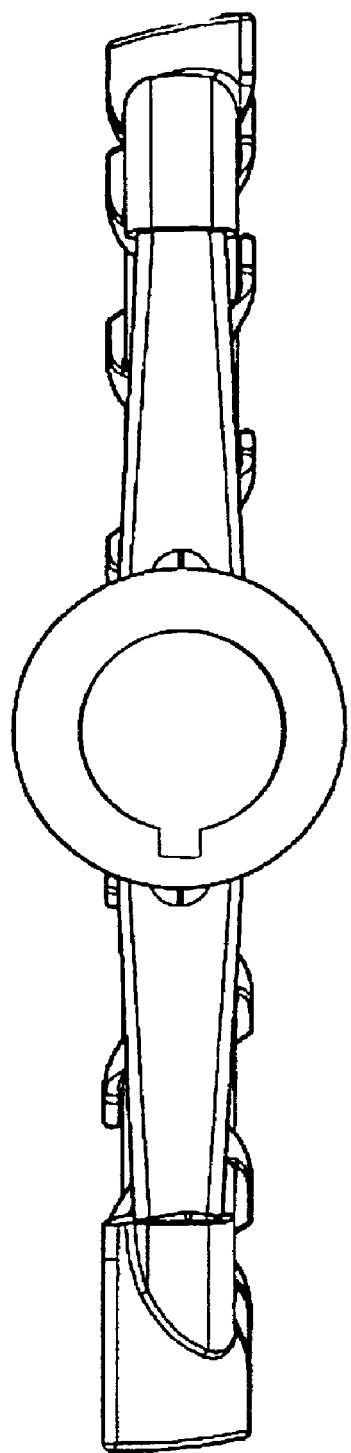
FIG. 3 is a top view of the mixer blade with one embodiment of an attachment of the present invention.
Figure 4:
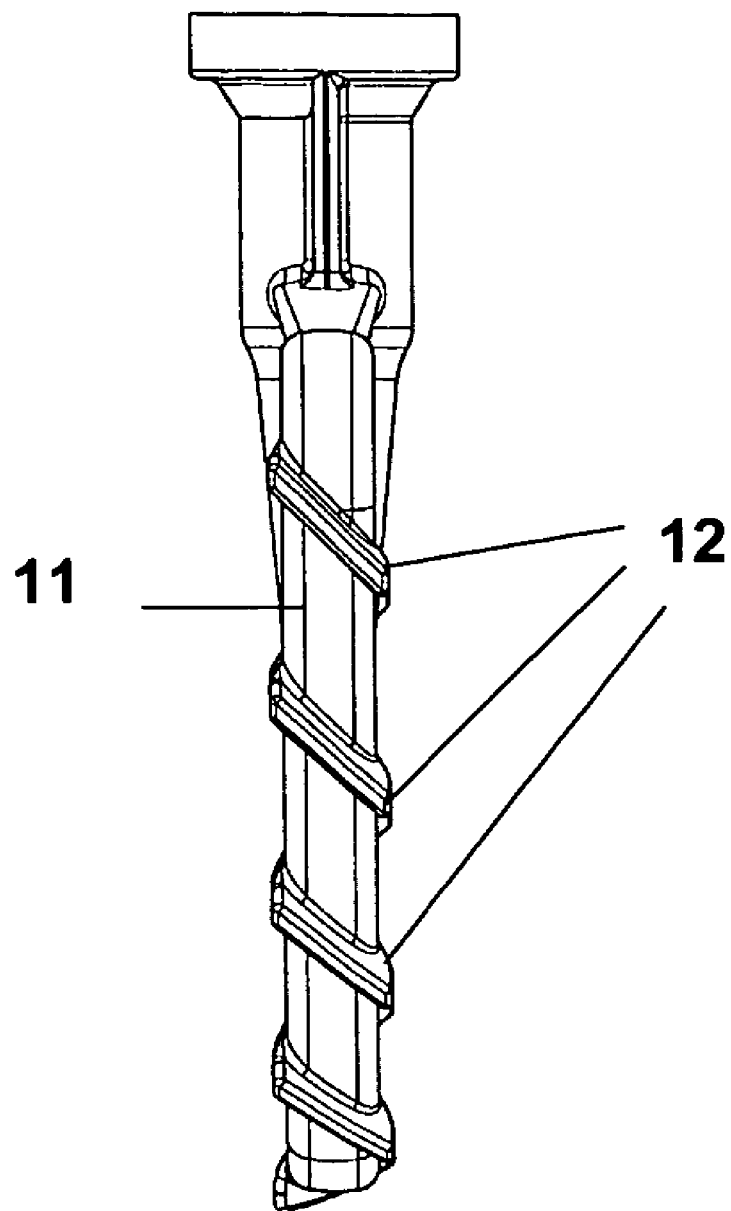
FIG. 4 is a left side view of the mixer blade with one embodiment of an attachment of the present invention.
Figure 5:
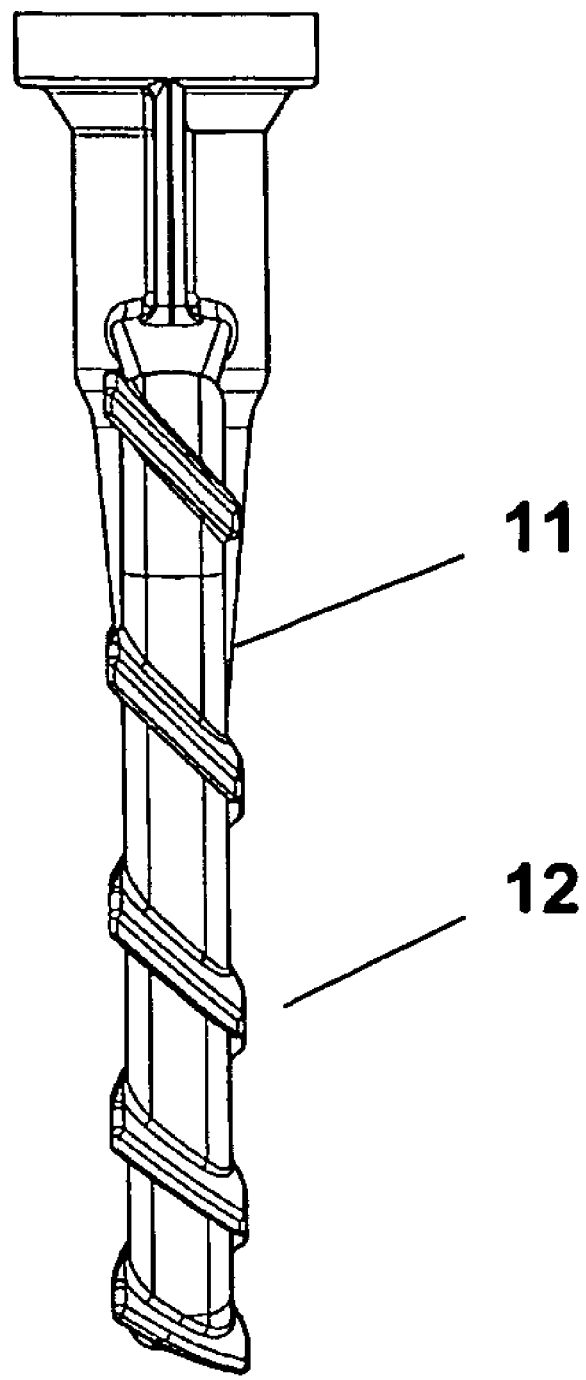
FIG. 5 is a right side view of the mixer blade with one embodiment of an attachment of the present invention.
Figure 6:
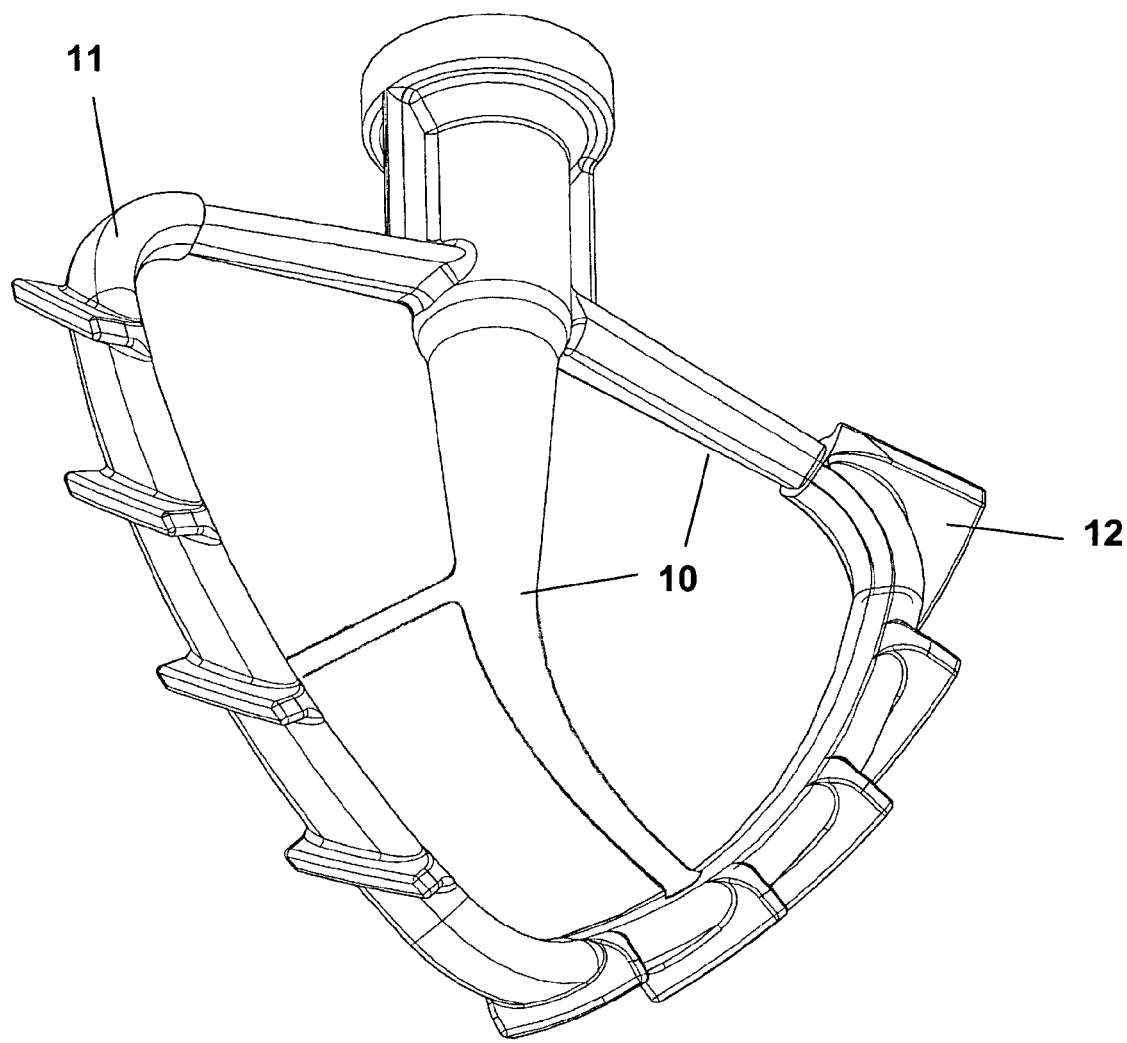
FIG. 6 is a bottom isometric view of the mixer blade with one embodiment of an attachment of the present invention.
Figure 7:
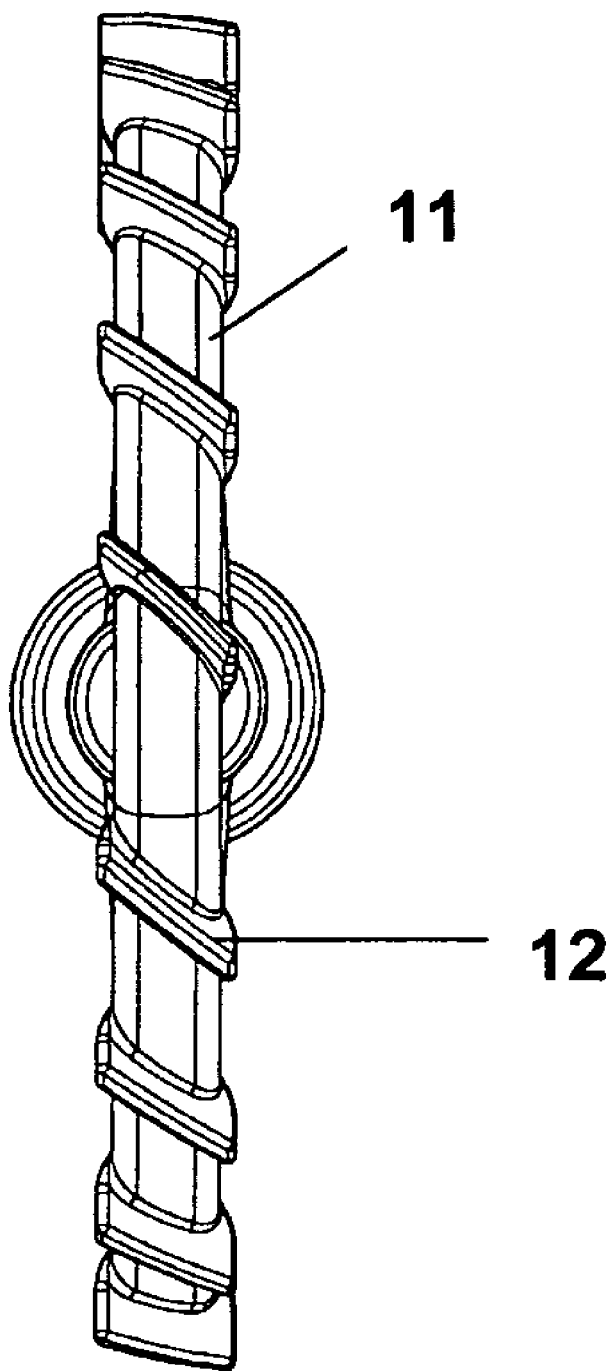
FIG. 7 is a bottom view of the mixer blade with one embodiment of an attachment of the present invention.

As is shown in FIGS. 4 and 5, showing the left and right side view of the mixer blade with attachment, the fins 12 are staggered along the sheath 11. This staggering assures that the inner surface of the container is wiped by a fin. The gap between the fins may reduce drag on the blade and assist in the mixing.

The fins 12 may be made of a poly (tetrafluoroethylene), flexible plastic, latex, or silicone rubber. The flexible fins 12 may be integral to the elastomeric sheath 11. As a result of the flexible material which makes up the plurality of fins 12 the attachment allows for the clean, smooth wiping of the sides of the container. Moreover, the flexible material will not damage the container.

The sheath 11 may be attached to the blade structure by use of a tie layer that binds the sheath 11 to the mixer blade 10. The tie layer may be chemically applied to the mixer blade 10. Once the tie layer is applied, the elastomeric sheath 11 with integral fins 12 may be heated onto the tie layer which connects it to the mixer blade 10. Although the tie layer is not required, it is one preferred way to adhere the elastomeric sheath 11 to the mixer blade 10.

Figure 8:
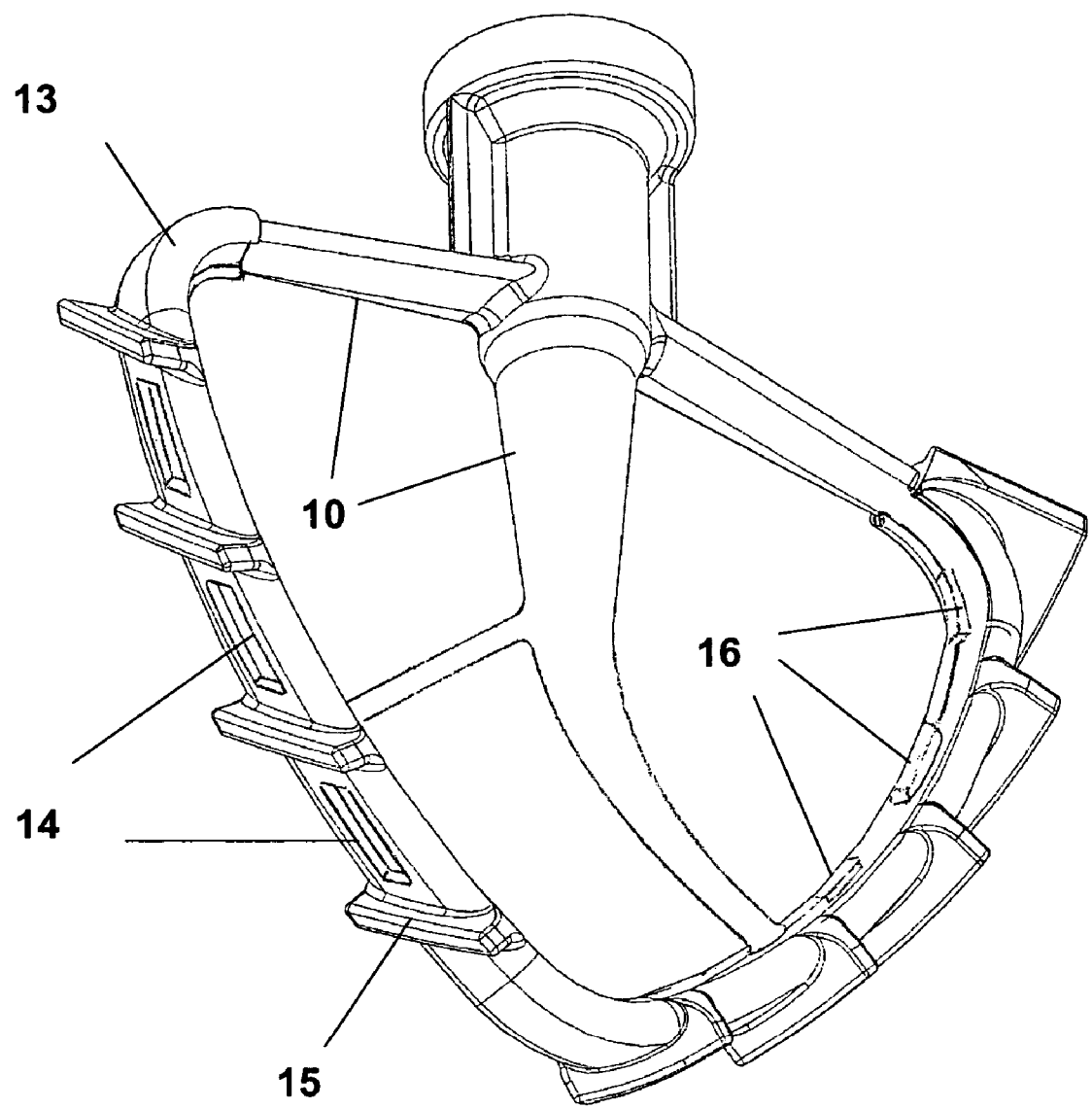
FIG. 8 is a bottom isometric view of the mixer blade with one embodiment of a snap-on version attachment of the present invention.

Another embodiment of an attachment affixed to a mixer blade is shown in FIG. 8. A rigid plastic snap on frame 13 may clip on the rigid mixer blade 10. The rigid plastic snap on frame 13 may comprise flexible elastomeric fins 15 that are over molded onto the rigid plastic frame 13. Unlike the first embodiment, the second embodiment does not require the use of heat to affix the attachment to the mixer blade and is temporary. The plastic sleeve snap-on attachment 13 may work like a jacket or sheath over the mixer blade 10. Accordingly, the snap-on attachment 13 may cover the mixer blade 10 either through a plurality of hook and loop fasteners, buttons, clasps, clips, or the like. In the shown embodiment, a plurality of snaps 16 may be utilized for affixing the frame 13 to the mixer blade 10. The plurality of snaps 16 may be integral to the rigid plastic frame and grip the mixer blade. A plurality of rectangular holes 14 in the snap on frame 13 may allow for the molding of the plurality of snaps 16. Once the attachment 13 is positioned it may operate similar to an attachment that has been applied by the heat process described above.

Figure 9:
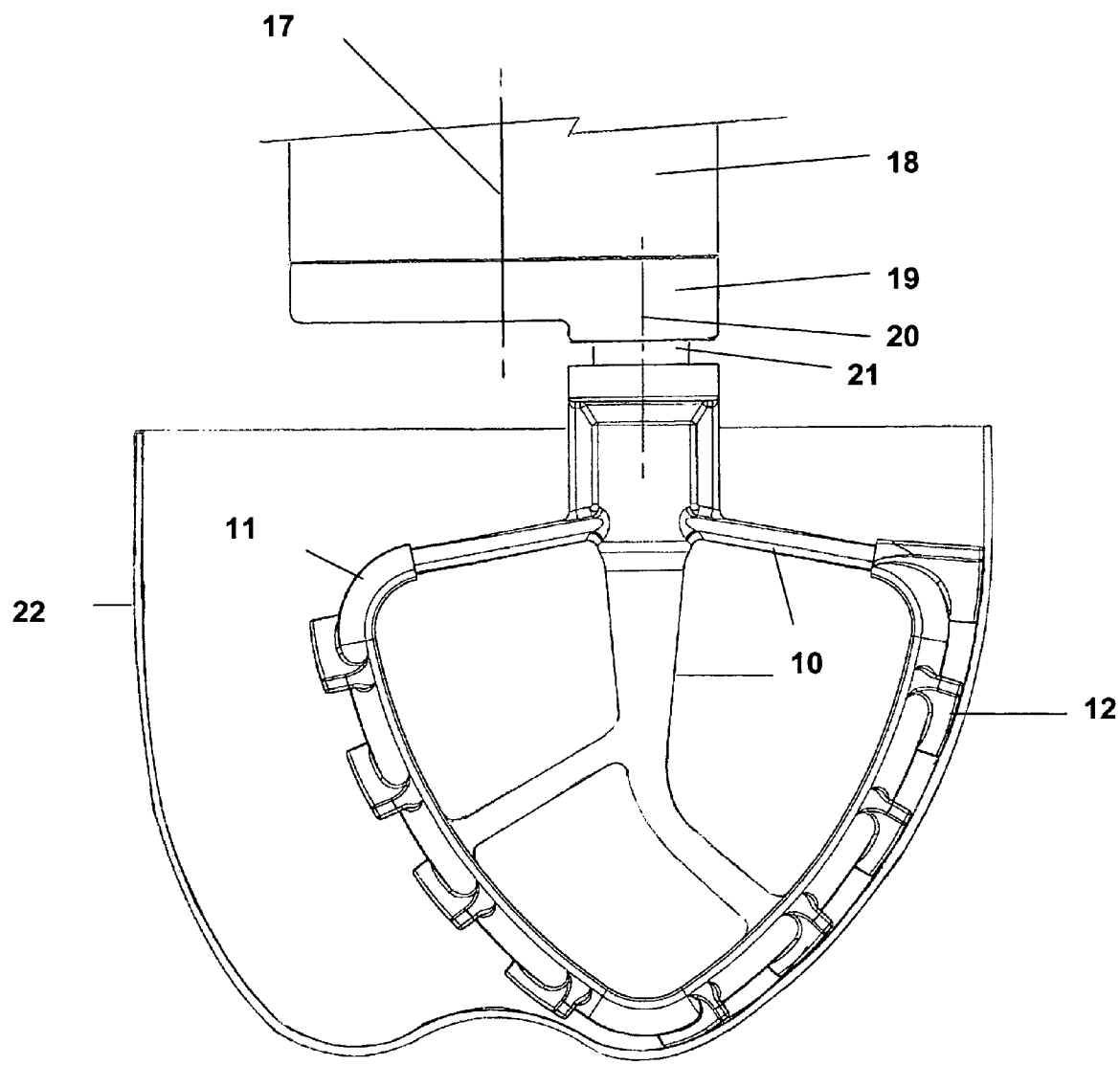
FIG. 9 is a front view of a cross-section of a container and mixer blade with one embodiment of an attachment of the present invention.

FIG. 9 shows a common stand mixer and the improved mixer blade in combination with a container. The over molded elastomeric sheath 11 in combination with the flexible fins 12 is shown attached to the mixing blade 10. The improved mixing blade solves the problem of having a gap between the side of the container 22 and the blade 10. The typical gap between the container and a standard mixer blade is a dead zone where the mixture sticks to the container walls and does not get mixed in unless other measures are taken. The mixer housing 18 includes the drive hub 19 that rotates on the central mixer axis 17. The mixer blade drive shaft 21 rotates on the mixer blade axis 20.

The flexible fins are placed in a position so that in conjunction with the rotating mixer blade, the flexible fins push down the material with every rotation of the mixer blade. By pushing the mixture toward the center of the container, the mixture will consistently and uniformly be mixed. Thus, the normal residue which is left by the mixture in an ordinary mixer blade may be mixed thoroughly by using the attachment.

The length of the flexible fins may vary. The fins may vary depending on the size of the container and the size of the mixer blade. The larger the container and the smaller the mixer blade, the larger the flexible fins may be. Alternatively, the smaller the container and the larger the mixer blade, the smaller the flexible fins may be. Thus, the disclosed invention pertains to containers of different sizes. In addition to providing a way of making a consistent and uniform mixture, the attachment is easy to clean.

Figure 10:
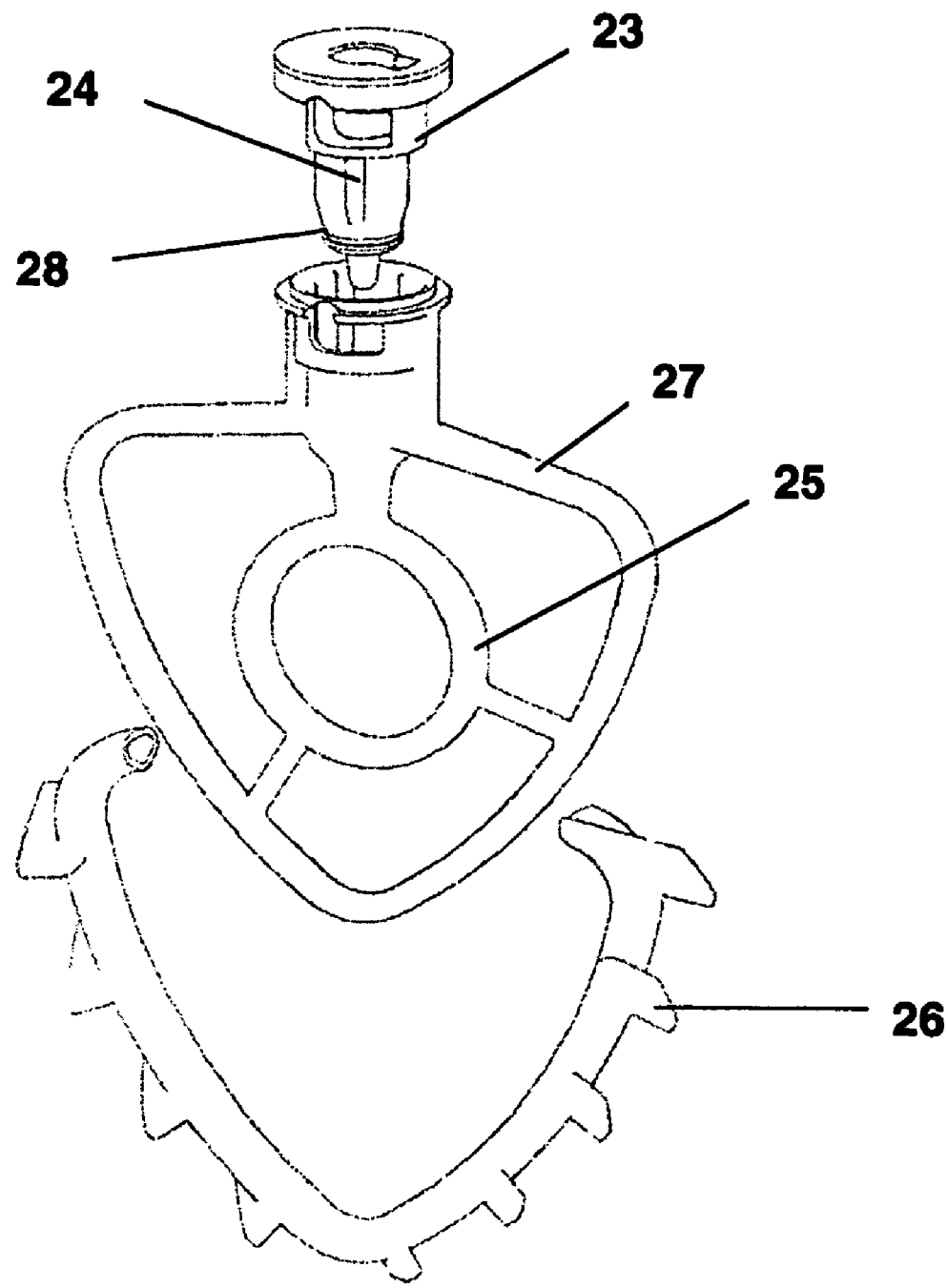
FIG. 10 is an exploded view of a mixer blade attachment according to one embodiment of the present invention.

FIG. 10 shows an exploded view of yet another embodiment of a mixer blade attachment of the present invention. In this embodiment a metal insert 23 attaches to the mixer drive shaft. There may be an annular groove 28 undercut in the insert 23 to prevent the plastic mixer blade 27 from slipping off. The plastic mixer blade 27 may be molded over the metal insert. This allows the metal insert 23 to change depending upon the manufacturer of the mixer so as to allow the mixer blade to fit many types of mixers. The metal insert 23 may have a plurality of splines 24 that grip the plastic to provide rotational gripping and prevent slippage. The mixer blade may have a circular frame design 25 that may assist in mixing. The flexible fins and sheath 26 may be over-molded onto the mixer blade.

The preferred embodiments herein disclosed are not intended to be exhaustive or to unnecessarily limit the scope of the invention. The preferred embodiments were chosen and described in order to explain the principles of the present invention so that others skilled in the art may practice the invention. Having shown and described preferred embodiments of the present invention, those skilled in the art will realize that many variations and modifications may be made to affect the described invention. Many of those variations and modifications will provide the same result and fall within the spirit of the claimed invention.

What is claimed is:

1. An improved blade for a mixer having a drive shaft, comprising:
   a means for attaching the blade to the drive shaft;
   a mixing body, disposed about an axis of rotation defined by the drive shaft attaching means, the mixing body having, when viewed in profile, a pair of rays that extend outward, forming an obtuse angle, from a vertex, the outward ends of the rays connected to a pair of curved arms that come to a noticeable but blunt point at a bottom of the body, the vertex and point aligned along the axis of rotation; and
   an elastomeric sheath, disposed on at least the pair of curved arms, the elastomeric sheath further comprising means for wiping a surface proximate to the mixing body as the mixing body is rotated by the drive shaft.

2. The blade of claim 1, wherein said elastomeric sheath is permanently attached to said mixing body.

3. The blade of claim 1, wherein said elastomeric sheath is a snap-on sleeve.

4. The blade of claim 1, wherein said means for wiping a surface comprises a plurality of fins.

5. The blade of claim 4, wherein each fin is arranged on the sheath at an oblique angle to the axis of rotation such that one edge of each fin is closer to the drive shaft.

6. The blade of claim 5, wherein the oblique angle is such that, for each fin, the edge thereof axially closer to the drive shaft precedes the opposite edge of the fin when the mixing body is rotated by the drive shaft.

7. The blade of claim 6, wherein the fins are in a spaced-apart relationship along the elastomeric sheath, with the fins alternatingly positioned in the axial direction, between bilaterally symmetrical sides of the mixing body.

8. The blade of claim 6, wherein said elastomeric sheath is permanently attached to said mixing body.

9. The blade of claim 6, wherein the elastomeric sheath is adhered to said mixing body using a chemically applied tie layer.

10. The blade of claim 6, wherein said elastomeric sheath is a snap-on sleeve.

11. The blade of claim 4, wherein the mixing body is attached at the vertex to the drive shaft attaching means.

12. The blade of claim 4, wherein the fins are in a spaced-apart relationship along the elastomeric sheath, with the fins alternatingly positioned in the axial direction, between first and second bilaterally symmetrical sides of the mixing body.

13. The blade of claim 4, wherein the mixing body is attached at the vertex to the drive shaft attaching means, and the elastomeric sheath is disposed on the curved arms.

14. The blade of claim 1, wherein the elastomeric sheath is adhered to said mixing body using a chemically applied tie layer.

15. The blade of claim 1, wherein the elastomeric sheath comprises silicone rubber.

16. The blade of claim 1, wherein said means for attaching the blade to the drive shaft is a metal insert.

17. The blade of claim 16, wherein the blade is molded over the metal insert.

18. An improved blade for a mixer having a drive shaft, comprising:
- a mixing body having, when viewed in profile, a pair of rays that extend outward, forming an obtuse angle, from a vertex, the outward ends of each ray connected to one of a pair of curved arms that come to a noticeable but blunt point at a bottom of the body, the mixing body having an axis of rotation defined by a line passing from the vertex and the point;
- a silicone rubber sheath permanently affixed along the curved arms, the sheath comprising a plurality of fins extending outwardly from the curved arms to wipe a surface proximate thereto, each fin arranged on the sheath at an oblique angle to the axis of rotation; and
- means for attaching the drive shaft to the mixing body, located at the vertex.

* * * * *